Sept. 24, 1963 W. J. GREENLEAF 3,104,453
ROTARY CUTTING TOOL
Filed May 9, 1961 3 Sheets-Sheet 1

INVENTOR.
Walter J. Greenleaf
BY
Ralph Hammar
attorney

Sept. 24, 1963     W. J. GREENLEAF     3,104,453
ROTARY CUTTING TOOL

Filed May 9, 1961     3 Sheets-Sheet 2

INVENTOR.
Walter J. Greenleaf
BY Ralph Hammar
Attorney

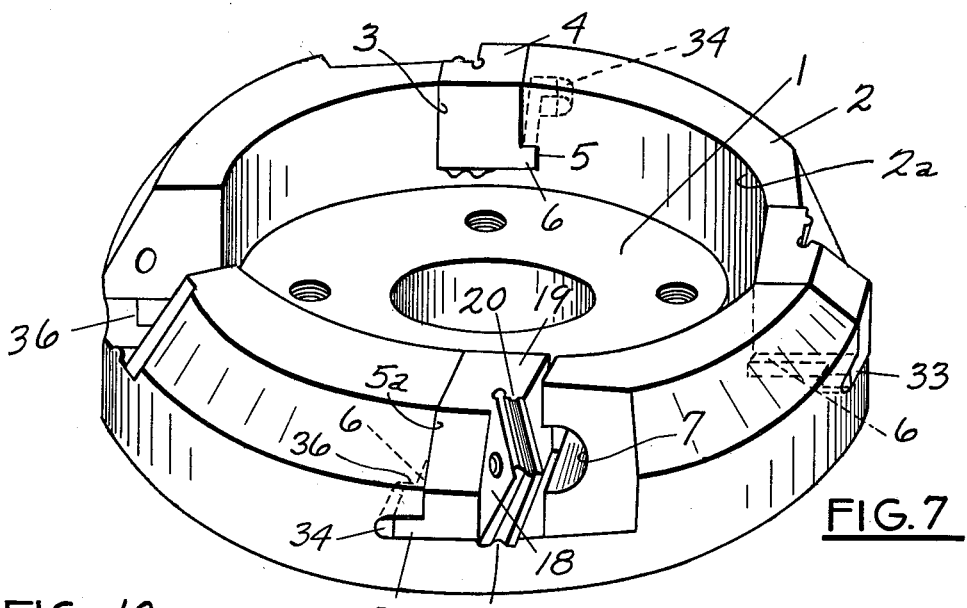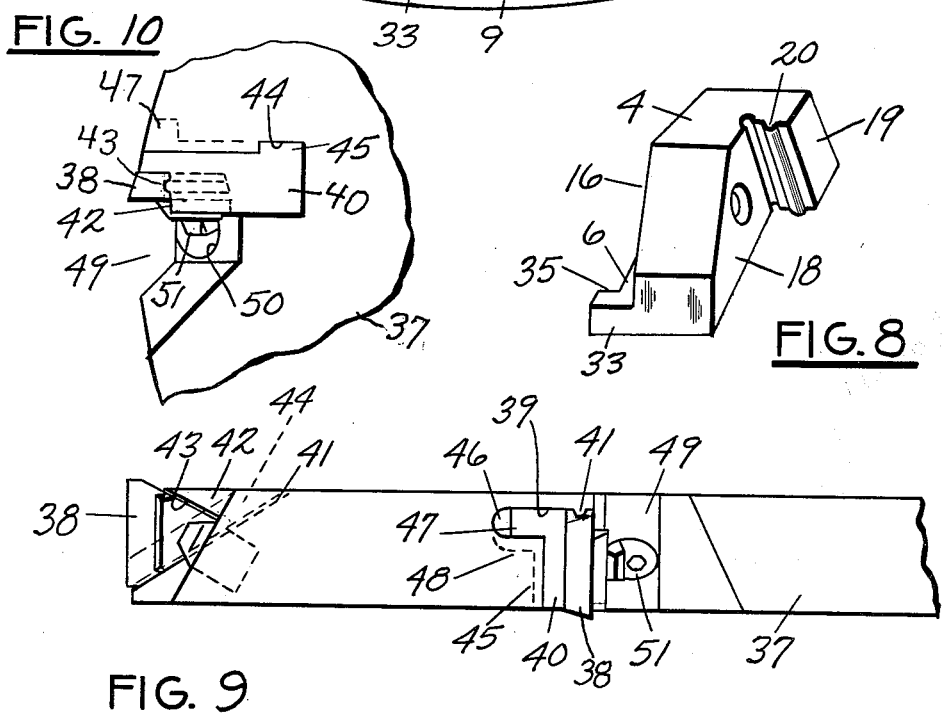

3,104,453
ROTARY CUTTING TOOL
Walter J. Greenleaf, R.D. 3, Meadville, Pa.
Filed May 9, 1961, Ser. No. 108,874
2 Claims. (Cl. 29—105)

This invention is an indexable bit rotary cutter in which the bits are seated in removable seat members positioned in open ended slots in the rim of the cutter body. The rim can extend either radially or axially from the cutter body. Each bit is located by two seats engaging adjacent sides or edges of the bit, one of the side seats being on the bit seat member and the other side seat being in the body of the cutter.

Figures 1, 6:
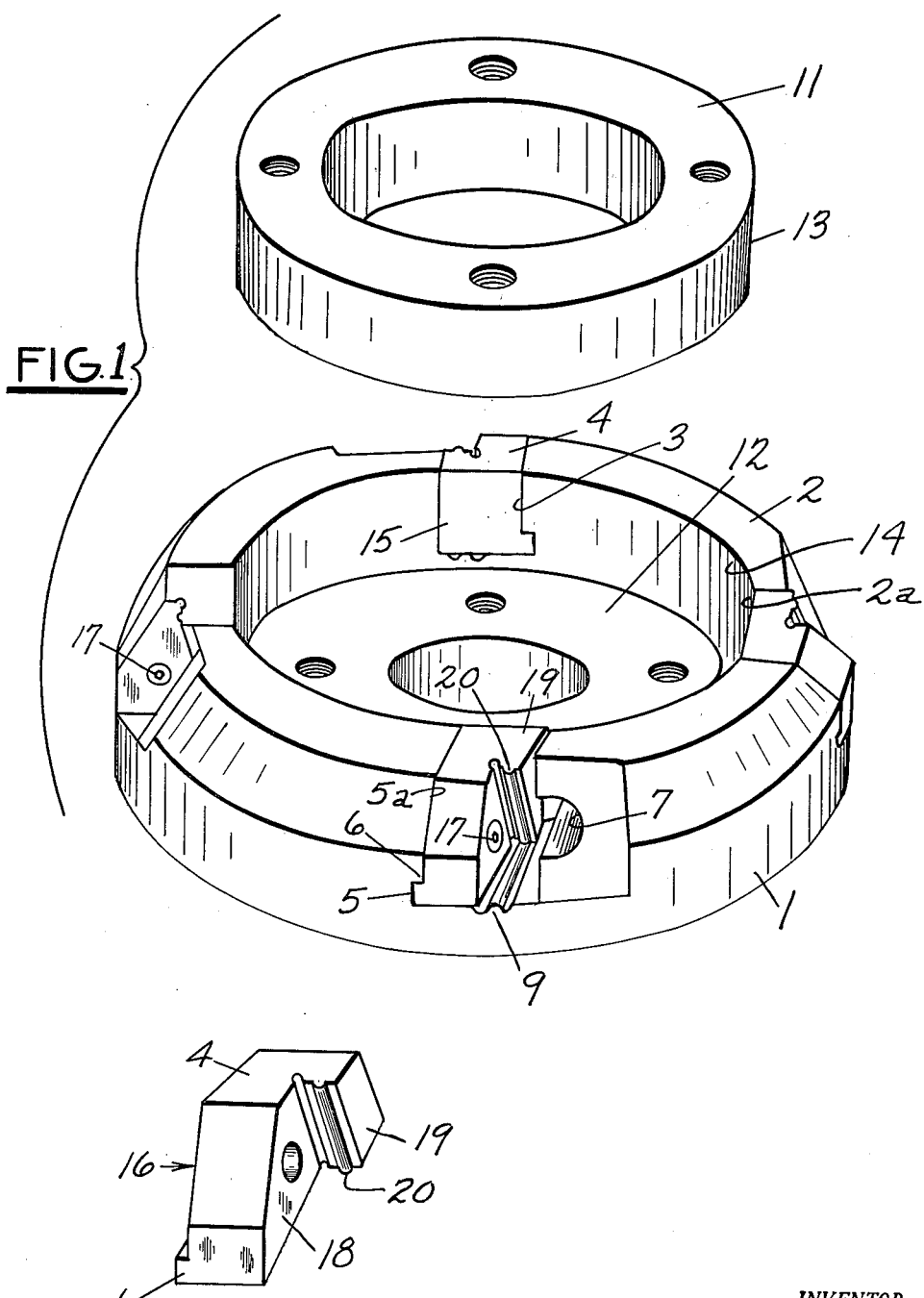
Figure 3:
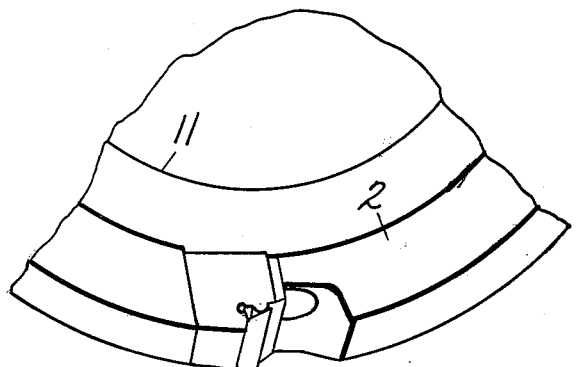
Figure 5:
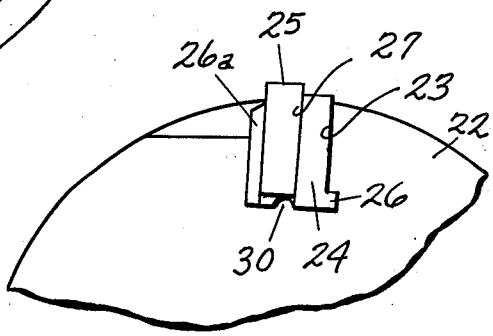
Figure 2:
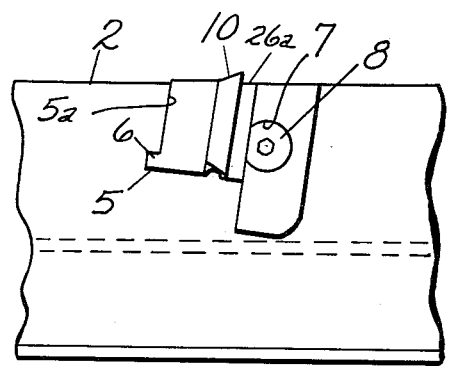
Figure 4:
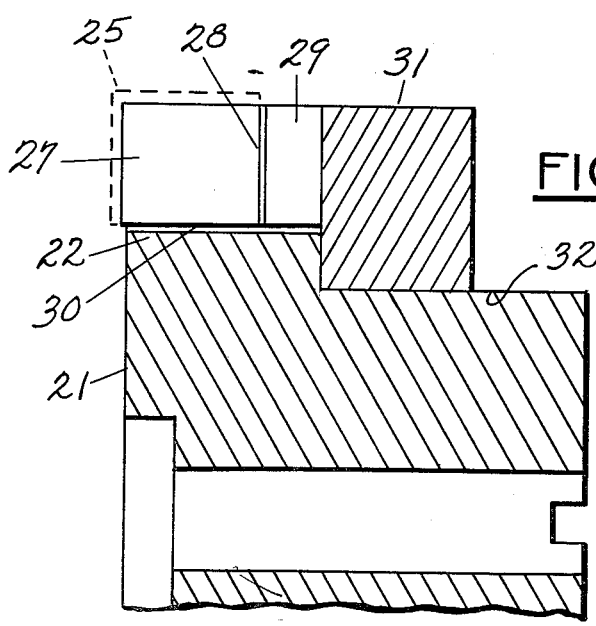

In the drawing, FIG. 1 is an exploded perspective of a cutter having an axially extending rim, FIG. 2 is a fragmentary edge view, FIG. 3 is a fragmentary front view, FIG. 4 is a fragmentary section through a cutter in which the rim extends radially, FIG. 5 is a fragmentary front view of the FIG. 4 cutter, FIG. 6 is a perspective of a bit seat member, FIG. 7 is a perspective of a modification, FIG. 8 is a perspective of the bit seat member for the FIG. 7 cutter, FIG. 9 is an edge view of a slotting cutter, and FIG. 10 is a fragmentary front view of the slotting cutter.

The invention is shown applied to a milling cutter having a body 1 with an axially projecting rim 2 overhanging a pocket 2a in one end of the body. Extending radially through the rim from side to side are a plurality of transverse slots 3 for receiving bit seat members 4. The slots 3 are open at both ends and easily machined in the rim 2 by straight cuts and after hardening may be finished ground by straight passes of a grinding wheel. The pocket 2a provides clearance for the machining and grinding operations. In one side 5a of each slot is a keyway 5 for receiving a keying projection 6 on a bit seat member 4. The clearance provided by the pocket 2a makes the machining of the keyway 5a a simple operation. The keying projection 6 prevents turning or rocking of the bit seat member which could interfere with the accuracy of the cut. On the opposite side of the slot is a hole 7 for a bit lock or wedge 8. Other bit locking means may be used which do not require the hole 7. In the bottom of the slot is a formed seat 9 for engaging and locating one side of a thin flat polygonal bit 10. The seats 9 may be accurately ground and position the bits to avoid cutter face run out. The bit has a plurality of cutting edges which are successively brought into active or cutting position by indexing the bit about an axis perpendicular to an end face of the bit. The seat 9 is remote from the active cutting edge and is not subject to damage by breakage of the bit which occurs adjacent the active cutting edge. Within the pocket 2a is a ring 11 bolted or otherwise fastened to the center section 12 of the body. The outer surface 13 of the ring is concentric with the inner surface 14 of the rim 2. When the ring is fastened in place, it forms a solid back up surface for the inner end surfaces 15 of the bit seat members 4. If desired, the end surfaces 15 may be contoured to fit accurately against the outer surfaces 13 of the ring 11. The body 1 and the ring 11 can be easily and accurately machined with relation to each other. From one aspect, the ring 11 is a stop means against which the bit seat members are located. Other stop means can be used.

The bit seat members 4 are adapted to be mass produced to very close dimensions. The under surface 16 of each bit seat member is held flat against surface 5a of the notch 3 by set screw 17 and in conjunction with the key 6 and keyway 5 and ring 11 positively locates the bit seat member in the notch 3. On the upper side of the bit seat member is an end seat 18 for the bit and an upstanding projection 19 having at one side a side seat 20 for one side of the bit. The side and bottom seats 18 and 20 can be accurately machined with reference to the bottom surface 16 and with reference to the seat 9 in the body 1. The angle of the slots 3 in relation to the center line and axis of the cutter determine the rake angle. The particular cutter illustrated in FIGS. 2 and 3 has positive rake bits.

In the cutter shown in FIGS. 4 and 5, the body 21 has a radially projecting rim 22 in which are machined a plurality of axially extending open ended slots 23 receiving bit seat members 24 for bits 25. Both sides of the rim are unobstructed so the machining operation is easily carried out. The bit seat members are located in the slots by a key 26. Each bit is clamped against the bit seat by a suitable wedge or lock (not shown) bearing on a chip breaker 26a. The construction of the bit seat member is similar to that shown in FIG. 6. There is an end seat 27 for the bit and a side seat 28 on an upstanding projection 29 for engaging one side of the bit. The adjacent side of the bit is located by a seat 30 in the body 21. The bit illustrated in FIGS. 4 and 5 is square, although it could obviously be of other shapes. As in the FIGS. 1 to 3 construction, the slots 23 are open at both ends and are easily machined and finish ground by straight cuts through the rim 22 of the body. The bit seat members 24 are located against a ring 31 suitably fastened on a cylindrical section 32 on the body. The ring 31 closes one end of the slots 23 and forms a precision locating surface for the bit seat members 24.

All of the parts of the cutter are adapted to mass production. The bodies 1 and 21, the slots 3 and 23, the seats 9 and 30 and the rings 11 and 31 are easily and accurately machined with relation to each other. The same is true of the bit seat members 4 and 24.

The cutter shown in FIGS. 7 and 8 is generally similar to that shown in FIG. 1, but the construction is such that the back up ring 11 is eliminated and the function of the back up ring is performed by projections on the bit seat members which cooperate with shoulders on the body of the cutter to locate the bit seat members with respect to the axis of the cutter and thereby perform the same function as the back up ring 11. Because the cutter in other respects is similar to the cutter of FIG. 1, corresponding parts are indicated by the same reference numerals and will not again be described. The location of the bit seat members with reference to the axis of the cutter is effected through projections 33 at the outer end of the keying projection 6 on the bit seat members. The projections 33 are received in slots 34 in the body of the cutter and the location of each bit seat member with respect to the axis of the cutter is obtained by engagement of a shoulder 35 on the projection 33 with a shoulder 36 at the bottom of the slot 34. By this design, not only is the need for the ring 11 eliminated, but the body of the milling cutter can be easily made in one piece.

In FIGS. 9 and 10 is shown a slotting cutter with indexable blades. The cutter has a body 37 which is quite thin, the thickness being hardly more than the length of one side of the triangular bit 38. In the rim of the body are inclined slots 39 for bit seat members 40. At the bottom of the slots 39 is a seat 41 for one side of the bit 38. The bit seat members 40 have upstanding portions 42 with seats 43 engaging another side of the bit 38 and cooperating with the seats 41 to accurately locate the bits 38 both radially and axially. In order to position each bit seat member 40 in the slots 39, the body has a keying slot 44 receiving a keying projection 45 on the bit seat member. Also, the body is provided with a slot 46 receiving a projection 47 at one end of the keying projection 45. Radial location of the bit seat member is effected by a shoulder 48 on the projection 47 which cooperates with a shoulder at the bottom of the slot 46.

In front of each of the slots 39 is a notch 49 providing chip clearance and a recess 50 for a suitable bit lock or wedge 51 for holding the bits in place.

Because the cutter of FIGS. 9 and 10 is a slotting cutter, the blades project alternately from the body 37, first from one side of the body and then from the other. This means that the inclination of the slots 39 and of the notches 49 alternates.

In all forms of the cutter the bits are located by a set of two seats respectively engaging two sides of the bits. One of the seats (20, 30, 41) locates the bit radially with reference to the center line or axis of the cutter. The other of the seats (9, 28, 43) locates the bit axially with reference to the back or mounting face of the cutter. The combination locates the bits both radially and axially in each index position so the bits indicate true and cut equal amounts of stock, each bit cutting in the same plane and thereby producing a good finish on the work.

In cutters using indexable triangular or square bits, it is difficult, if not impossible, to machine both of each set of bit locating seats directly in the body of the cutter. This difficulty is avoided by machining one seat (9, 30, 41) of each set in the body of the cutter and by machining the other seat (20, 28, 43) of each set in the bit seat member. The manufacture is further simplified by locating the bit seat members in slots machined across the rim of the cutter.

What is claimed as new is:

1. A rotary cutter comprising a body with a rim, a plurality of angularly spaced open ended slots extending through the rim and having a keyway at one side of each slot and extending lengthwise of the slot, a bit seat member in each slot and seated against said one side of each slot, said bit seat member having a keying projection fitting in said keyway, said bit seat member having an end seat spaced from said one side of the slot for a thin flat bit with polygonal sides providing cutting edges successively brought into cutting position by indexing the bit about an axis through an end face of the bit and said bit seat member further having an integral portion upstanding from the end seat and provided with a side seat for engaging one side of the bit, said body having in each slot a side seat for engaging another side of the bit, means for fastening the bit seat members in said slots, and means for clamping the bits against the end seats of the bit seat members, said side seats cooperating to locate the bits on the end seats.

2. A rotary cutter comprising a body with a rim, a plurality of angularly spaced open ended slots extending through the rim and having a keyway at one side of each slot and extending lengthwise of the slot, another slot in the body at one end of each open ended slot and extending inward from the bottom of the keyway transverse to the open ended slot to provide a shoulder, a bit seat member in each slot and seated against one side of each slot, said bit seat member having on one side a keying projection fitting in said keyway, said keying projection having a further projection extending into said other slot and having a shoulder cooperating with the said first shoulder to position the bit seat member in the open ended slot, said bit seat member having an end seat spaced from one side of the open ended slot for a thin flat bit with polygonal sides providing cutting edges successively brought into cutting position by indexing the bit about an axis through an end face of the bit and said bit seat member further having an integral portion upstanding from the end seat and provided with a side seat for engaging one side of the bit, said body having in each open ended slot a side seat for engaging another side of the bit, means for fastening the bit seat members in said open ended slots, and means for clamping the bits against the end seats of the bit seat members, said side seats cooperating to locate the bits on the end seats.

References Cited in the file of this patent
UNITED STATES PATENTS

| | | |
|---|---|---|
| 2,805,467 | Greenleaf | Sept. 10, 1957 |
| 2,805,469 | Greenleaf | Sept. 10, 1957 |
| 2,982,008 | Facknitz | May 2, 1961 |